United States Patent [19]

Hyman, Jr.

[11] 3,951,847
[45] Apr. 20, 1976

[54] SCINTILLATOR COMPOSITION
[76] Inventor: Mark Hyman, Jr., 62 Woodbine Road, Belmont, Mass. 02178
[22] Filed: June 26, 1974
[21] Appl. No.: 483,317

[52] U.S. Cl............................ 252/301.17; 250/361; 250/362; 260/307 G
[51] Int. Cl.² ..................... F21K 2/02; C09K 11/06; C07D 271/10; G01T 1/20
[58] Field of Search.......... 252/301.2 C; 260/307 G; 250/361

[56] References Cited
FOREIGN PATENTS OR APPLICATIONS
896,219  5/1962  United Kingdom............. 260/307 G OTHER PUBLICATIONS
Chem. Abstr., Vol. 59, 8727(c), (1963).

Primary Examiner—G. L. Kaplan
Assistant Examiner—Aaron Weisstuch
Attorney, Agent, or Firm—Frank A. Steinhilper; Alfred H. Rosen

[57] ABSTRACT

A new scintillator composition, consisting essentially of di-m-methylphenyl-1,3,4-oxadiazole, or 2,5-di-m-tolyl-1,3,4-oxadiazole, is prepared by reacting m-toluoyl chloride with hydrazine to form di-m-toluoyl hydrazine which, in turn, is reacted with thionyl chloride to form the desired product which is dissolved in an organic solvent. The scintillator, di-m-methylphenyloxadiazole compares favorably with present commercial products, being equal to or better than diphenyloxazole in most important respects and significantly superior in scintillation pulse height and in stability. It can be produced at a fraction of the cost of today's most widely used product.

4 Claims, No Drawings

SCINTILLATOR COMPOSITION

BACKGROUND OF THE INVENTION

This invention relates generally to a new scintillator composition. With the increasing use of radioactive materials there is a growing need for an increasing use of scintillators which are adapted to receive atomic radiation and convert it into a form of radiation which can readily be detected and measured. The scintillators have a number of other uses and in some instances, scintillators are significant parts of lasers and other experimental and commercial products. The principal use and application, however, of the kind of scintillators contemplated in the present invention, is for measuring or counting atomic radiation and the principal product now on the market for this purpose, sometimes known as PPO, is 2,5-diphenyloxazole. In its ordinary use, the scintillator is dissolved in a solvent such as toluene, and in fact, often is sold commercially in the form of a relatively concentrated solution in toluene. In normal use and application, a sample is prepared which is to be measured for its radioactivity and this sample is dissolved or dispersed in toluene or a solvent miscible with toluene and mixed with a measured quantity of the scintillator. In practice, a sample is usually added to a vessel containing the measured quantity of scintillator and usually also containing a secondary fluor. Radioactivity triggers the scintillator so that it emits visible or other measurable radiation in response to such radioactivity. Usually the emission is detected or counted with the aid of a photomultiplier tube. A count of the emission by the scintillator is directly responsive to the amount of radioactivity in the sample. One of the most common uses of this way of measuring radioactivity is in connection with medical or biological research where a compound or product containing radioactive carbon or hydrogen is supplied to an organism and the radioactivity is used to trace the compound after ingestion. Other radioactive atoms can be used, but carbon and hydrogen are most common. Medical and biological laboratories often are equipped to handle such tests and laboratory personnel trained to use existing equipment and methods. It is particularly desirable, therefore, that a scintillator be compatible with existing techniques and that it will not be necessary to change procedures in using such other scintillators.

GENERAL NATURE OF THE INVENTION

The present invention relates to a new scintillator composition useful in conventional laboratory testing techniques to measure radioactivity. The scintillator is di-meta-methylphenyloxadiazole represented by the following structural formula.

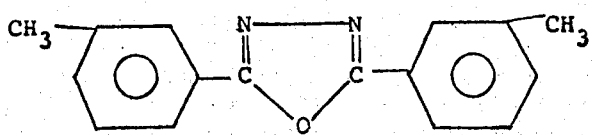

The scintillator, di-m-methylphenyloxadiazole, is characterized by high solubility in toluene, xylene or other solvents which are ordinarily used for radioactive testing with scintillators. It is more responsive to radioactivity than the present leading commercial product. Pulse height of the present scintillator is higher than the corresponding pulse heights of the products generally in use. It is surprising that this is so, and in particular, it is surprising that the di-meta-methyl product is very soluble in the usual solvents because orthomethyl and para-methyl derivatives are much less soluble.

The new scintillator composition can be made inexpensively from m-toluoyl chloride and hydrazine by reacting these two compounds to form di-m-toluoyl hydrazine, which in turn is treated with thionyl chloride to form directly the di-meta-methylphenyloxadiazole, 2,5-di-m-tolyl-1,3,4-oxadiazole, which is then dissolved in an organic solvent. Starting materials for this reaction are readily available and relatively inexpensive. In addition, unlike certain of the materials which possess scintillator characteristics, the yields of this product are good, in part, because the product is a symmetrical organic compound. The cost to manufacture the present scintillator is a fraction of the cost of 2,5-diphenyloxazole, which currently is the scintillator most commonly used.

DETAILED DESCRIPTION OF THE INVENTION

The scintillator material di-meta-tolyl-oxadiazole is not believed to be commercially available. One procedure which can be employed for preparation is according to the procedure set forth herein as Example 1.

EXAMPLE 1

In a vessel equipped with stirrer, reflux condenser, and dropping funnel, were placed 400 parts chloroform and 3.2 parts hydrazine. Stirring was started, and 32 parts m-toluoyl chloride was dripped in over a 10-minute period. Heat evolved and a white slurry formed. After 15 minutes additional stirring, 30 parts triethylamine was dripped in over a 10-minute period. More heat was evolved. The stirred mixture was warmed to gentle reflux for one hour, then cooled and filtered. The precipitate was washed with chloroform on the funnel and then air-dried. It was again washed with isopropanol and again dried.

23.5 parts of the thus-prepared di-m-toluoyl hydrazine was mixed with 25 parts thionyl chloride, and warmed to gentle reflux overnight. Most of the excess thionyl chloride was distilled off. Then was added 150 parts toluene and co-distilled with the remaining thionyl chloride. Another 100 parts toluene was added, and the solution was refluxed for 1 hour with carbon black. The warm solution was filtered through a bed of activated alumina. The toluene was distilled off in vacuo. The product was recrystallized from 60 parts hot isopropanol to yield color-free crystals of di-m-methylphenyl-1,3,4-oxadiazole, having a melting point of 82° to 83° C.

For standard use in present day techniques as a scintillator to measure radioactivity in a conventionally prepared medical or biological sample, the di-meta-methylphenyloxadiazole was dissolved in toluene to form a concentrated stock solution containing 100 grams di-meta-methylphenyloxadiazole per liter of solution. In addition, 1.25 grams of 2,2'-p-phenylene bis (5-phenyloxazole) (generally known as POPOP) was added as a secondary fluor. This standardized product is suitable for use by diluting and adding a measured amount to a desired sample and also is suitable for shipping as a concentrated standard stock solution. It is intended as a commercial product in this strength. Before use, the solution is diluted to bring its concentration to a desired standard concentration. Other secondary fluors may be used and one of the more widely used is bis-MSB, or p-bis- (o-methylstyryl) benzene. When bis-MSB is used, it is preferred to use it in concentration of about 100 mgs per liter in the final dilution, or about 2.5 grams per liter in the concentrated standard stock solution.

In laboratory use of the new scintillator compositon, a suitable test sample is prepared. For example, a medical laboratory test might be made to determine the amount of radioactivity in a sample which was prepared from a biological specimen including radioactive carbon, radioactive hydrogen or other radioactive element which had been incorporated with a compound fed to an animal to determine its path through an animal body. Usually a laboratory sample is prepared and added to a measured quantity of scintillator. For reproducible test results, the scintillator may be dissolved in toluene or other solvent, a secondary fluor added, and then diluted to form a standard solution containing 5 grams per liter of m-methylphenyloxadiazole.

The scintillator may also be used to detect or measure other high energy particles or high energy emission.

The scintillator of the present invention has been compared against present scintillators and against certain close homologs of m-methylphenyloxadiazole. Pulse heights increased by about 5 to 10 percent. The present scintillator is more than ten times as soluble in toluene as di-ortho-methylphenyloxadiazole or the para-methylphenyl homolog.

Quantities of oxadiazole homologs were prepared according to the procedures similar to that employed in Example 1. The procedure was employed to prepare di-o-methylphenyl oxadiazole and di-p-methylphenyl oxadiazole. The solubility of di-p-methylphenyl oxadiazole is 14 grams per liter at 0°C and the solubility of di-ortho-methyl di-phenyloxadiazole is 32 grams per liter at 0°C, both in toluene. This solubility is undesirably low for a commercial product, and, in fact, impairs its usefulness in standard techniques. The same procedure was employed with m-methylphenyloxadiazole and it was determined that the solubility of the m-methyl homolog is 361 grams per liter at 0°C, which is well in excess of the desired 100 grams per liter solubility. A similar procedure was employed with di-p-methoxy-phenyl oxadiazole which was found to have a solubility of 5 grams per liter.

A similar procedure was employed to prepare di-p-tertiary-butyl-phenyl-oxadiazole which was found to very soluble in toluene. The butyl homolog was tested for scintillation pulse height according to standard techniques and compared with both diphenyloxazole and di-m-methylphenyloxadiazole. In standard test concentrations of 4 to 5 grams per liter, which is considered to be typical of the concentrations in actual use in laboratories, it was found that the butyl homolog resulted in pulse peaks essentially equal to the pulse peaks obtained from diphenyloxazole and that the pulse peaks obtained with the m-methyl homolog were at least 10 percent higher than the peaks obtained with either the butyl homolog or diphenyloxazole.

Cost calculations have been made of the manufacturer's cost of di-m-methylphenyloxadiazole, and it is calculated that this product can be manufactured at a fraction of the cost of the similarly calculated cost of manufacturing PPO.

A number of other methyl, butyl, propyl, methoxy and other homologs of di-m-methylphenyloxadiazole have been prepared and tested at least to determine one of the characteristics of solubility in toluene and pulse height in a standard solution containing 4 grams per liter in toluene. It is conventional to ship scintillators of the diphenyloxazole class in a solution containing about 100 grams per liter dissolved in toluene, and each of the homologs thus prepared was first screened according to its solubility in toluene. Those capable of dissolving to form solutions more concentrated than 100 grams per liter were also tested in the laboratory to determine their pulse height. Di-m-methylphenyloxadiazole produced the highest pulse peaks of any of the compounds tested.

One of the advantages of the scintillator is that it is more stable under ordinary laboratory working conditions than are the scintillators of the prior art. This improved stability makes it less important to follow strict laboratory procedures in order to protect the scintillator against deterioration.

Two samples of scintillators were kept in clear glass bottles for a period of three days in ordinary room light. The purpose was to simulate as well as possible, normal operating conditions in which a reagent is removed from storage from time to time in order to be used in laboratory testing. In the three day period, the present scintillator, di-m-methylphenyloxadiazole deteriorated to about 91% of its original efficiency or response to radiation from tritium. In contrast, diphenyloxazole, which had a somewhat lower efficiency when fresh, in addition, deteriorated more rapidly, dropping to 79 percent of its original efficiency during the same three day period. Each sample contained 5 grams of scintillator per liter total volume. After the same sample had been allowed to stand in ordinary room light for one week, the sample containing diphenyloxazole had deteriorated to slightly less than 50 percent of its original efficiency, whereas the sample containing di-m-methylphenyloxadiazole still remained about 90 percent of its original efficiency.

The scintillator m-methylphenyloxadiazole has also been prepared in the form known as a plastic scintillator. The scintillating fluor is dissolved in monomeric styrene or vinyl toluene and the material is then polymerized. It is usual to employ sheets of such polymers containing scintillators in high energy physics research. M-methylphenyloxadiazole is also an excellent scintillator when dissolved in the usual plastic vehicles.

Certain compounds are known as quenchers, and will reduce the measurable response efficiency of a scintillator. Chloroform is known to be such a quencher, and the present scintillator is more resistant to chloroform quenching than is PPO.

I claim:

1. As a scintillator, a composition consisting essentially of 2,5-di-m-tolyl-1,3,4-oxadiazole in an organic solvent, adapted to emit measurable radiative pulses when exposed to high energy radiation.

2. A scintillator composition comprising 2,5-di-m-tolyl-1,3,4 oxadiazole in solution in an aromatic hydrocarbon adapted, when exposed to high energy radiation, to emit measurable radiation pulses.

3. The composition of claim 2, wherein the aromatic hydrocarbon is toluene.

4. A scintillator composition according to claim 2, wherein the aromatic hydrocarbon is a polymerized aromatic hydrocarbon.

* * * * *